United States Patent Office 3,376,109
Patented Apr. 2, 1968

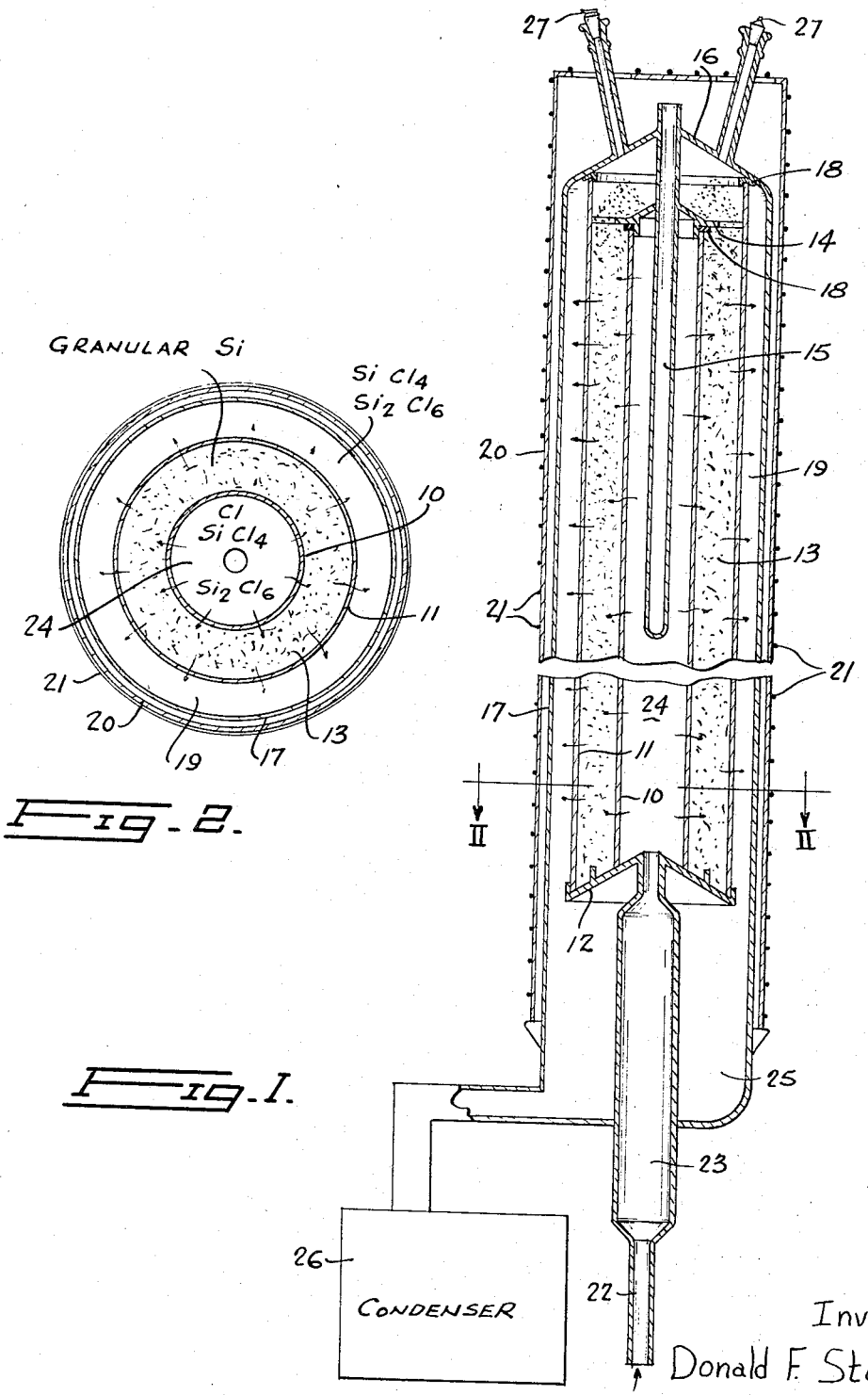

3,376,109
PREPARATION OF SILICON CHLORIDES
Donald F. Stedman, Ottawa, Ontario, Canada, assignor to Canadian Patents and Development Limited, Ottawa, Ontario, Canada, a corporation of Canada
Filed Apr. 30, 1965, Ser. No. 452,127
5 Claims. (Cl. 23—205)

ABSTRACT OF THE DISCLOSURE

A process of reacting a gas with a solid reactant in which the solid reactant is arranged in a thin layer to prevent the formation of either hot or cold spots in the solid reactant during an exothermic or endothermic reaction, respectively. An example of such a process is the reaction of chlorine with solid silicon arranged in a thin layer to produce the higher silicon chlorides.

---

This invention relates to improvements in processes in which a gas and a solid are reacted to produce a volatile product, and particularly relates to the maintenance of thermal control of such processes in which appreciable heat emission or absorption occur. In known methods, there is a tendency for undesirably hot or cool areas to form in the solid reactant due to the inherent thermal operation of the process itself. With the improvements herein defined such hot or cool areas are effectively prevented and an essentially uniform temperature is maintained under positive control, despite even large heat emissions or absorption in the process.

By known processes in which a gas is reacted through a granular solid mass any exothermic reaction tends to overheat the area of contact; in the endothermic case, local areas become excessively cooled. In both cases the actual reaction temperature is quite different than that defined overall by the major control; the product obtained relates to this different temperature; and this temperature is unstable, variable, difficult to control, and in many cases is not actually controllable at all, since the process sets its own conditions, more or less independently of attempts at external control.

As an example of the foregoing, the invention further relates to an improved process for the production of the higher silicon chlorides, more particularly silicon hexachloride ($Si_2Cl_6$), by the interaction of chlorine and silicon.

As illustration of processes according to this invention, the production will be described of the higher silicon chlorides, $Si_2Cl_6$; $Si_3Cl_8$; $Si_4Cl_{10}$ and others of linear or cyclic configurations, some too complex to have been exactly characterised, but useful either in the separated or mixed condition, which hitherto have not been economically available in appreciable quantities.

Conventionally the reaction of chlorine with silicon yields silicon tetrachloride ($SiCl_4$) as the main product. In the past it has proved difficult to obtain any substantial yield of the higher silicon chlorides, although these always appear in this process in small quantities, usually only a small fraction of 1%, and only with considerable difficulty as much as a few percent. For example, in prior processes designed for the production of silicon hexachloride, the highest yield obtainable has been of the order of three percent, the vast majority of the output being the tetrachloride.

One of the difficulties in carrying out such a process flows from its strongly exothermic nature. There is a tendency for the heat generated to become localized in one area in the reactor. Often when attempting to react chlorine with silicon on any appreciable scale, the reagents have tended to ignite at the point of entry of the chlorine into the reactor, and as a result, irrespective of the nominal reactor temperature, the major reaction zone tends to become undesirably hot, and since the hot reaction products in continuing their flow through the reactor carry with them this high temperature, even the small amount of higher chlorides produced in the primary reaction are further decomposed as the products pass to the exit.

It is an object of the present invention to provide an improved process by which these disadvantages can be greatly minimized, and effectively avoided, and in which a yield of the hexachloride can be achieved substantially higher than with prior art methods.

A further object of the invention is to provide a reactor suitable for carrying out this and like processes.

Such a reactor is useful for a great variety of purposes, e.g. those in which the desired product is unstable and is destroyed by too much heat; for the operation of equilibrium processes in which the equilibrium conditions obtained are variable with temperature; for processes in which an undesirably large heat emission causes severe refractory problems; or for cases in which heat absorption tends to quench the desired reaction, in the event that such heat absorption is allowed by the reactor design to become localized.

The principle of the operation of the reactor in maintaining positive temperature control is that the reactor is so shaped that heat is automatically distributed within the reactor and either hot or cold spots are thereby prevented. With suitable heating or cooling by ordinary well known methods, either internal or external, the real reaction temperature of the products can then be maintained throughout its volume.

These heating or cooling methods will vary with the amount of heat absorbed or emitted by each reaction and the temperature required, but since heating and cooling methods are well known and do not affect the principle by which thermal control is maintained within the reactor, they are not described in detail herein.

In the preferred form of this invention the solid reactant is provided as a suitably ground powder arranged in a thin layer of considerable area, but of so little thickness that heat passes completely through its thickness in either direction without any appreciable obstruction. In this manner any heat of reaction appears uniformly throughout the thickness of the layer, irrespective of the gas flow, or its direction, and temperature differences localized at the point, or area, of entry of the reacting gas are avoided and absolute control of the reaction temperature can therefore be maintained.

In previous reactors for such purposes the depth of solid reactant has been much more than would satisfy these requirements, on the basis of ensuring that reaction is completed, and a very thin layer as here specified would appear to defeat this requirement. However it is found that the reacting layer can be reduced even as low as 3/16" or thereabouts, and provided, as with this reactor, that proper temperature is maintained, still secure close to 100% reaction. In any event known methods can separate traces of unreacted gas from the products, by condensation, distillation or the like, and recirculate it.

It will be seen also that, by this method, the reaction products do not carry any excess heat further through a deep bed of solid reactant, this flowing from the fact that the reaction bed is terminated in a very short distance, and that there is no primary reaction zone of enhanced temperature.

In furnaces of any scale thickness of the solid reactant layer can be adjusted in relation to the grain size of the reactant, and therefore to its heat transmission factor, to satisfy the requirement that local overheating is not produced by the reaction, to any degree adequate to prevent real temperature control of the process throughout the reactor.

On a small scale, since the total amount of reaction is rather small and so well distributed, it is inadequate to maintain the required temperature and extra heat can be applied, conveniently electrically. On a larger scale the reaction heat exceeds that actually needed, and internal cooling must be used, or the gas flow should be used as a thermostat, either process being controlled as is conventional.

Within this invention it makes no difference what form the reactant layer takes, as long as the above thermal requirements are satisfied. The form of the reactant layer can for instance be in flat areas bounded on one side by a gas inlet area, and on the other side by a gas exit area, the reactant being retained by flat porous partitions unreactive to the gas and solid, while permitting passage of the gas and volatile products. Such flat areas may readily be arranged in pairs, the reactor having five spaces containing alternately gas: solid: gas: solid: gas, the central gas space serving for the flow through both solid layers, either as inlet or exit, as convenient. Such paired constructions can also be placed together in groups, if each group is provided with a positive temperature control, either in the form of heating or cooling.

Other constructions will also be possible. The reactor may for instance be in the form of a hollow space, of circular, tubular dome or other shape, as may be convenient as a construction to retain a thin layer of solid reactant between porous members, of either unit or built-up construction. The gas flow may be inward towards a hollow interior, or outward from the hollow interior.

One form of reactor which may be employed for carrying the invention into practice is illustrated diagrammatically in the accompanying drawings. It should be understood that this illustration and the description thereof are provided by way of example only and not by way of limitation of the scope of the invention, which latter is defined in the appended claims.

In the drawings:

FIGURE 1 is a general side view of the reactor; and
FIGURE 2 is an enlarged scale cross-section on the line II—II in FIGURE 1.

The main part of the reactor comprises a coaxially arranged pair of porous tubes 10 and 11 which, at their lower ends, are mounted on a support 12 and at the top are maintained at their proper spacing, so as to define an annular intermediate space 13, by circumferentially spaced glass spacers 14 and a thermometer or thermocouple well 15 which extends down into the tube 10 from an upper structure 16 continuous with an outer encasing glass envelope 17, the structure 16 supporting tubes 10 and 11 with seals 18 of relatively soft sealing material, e.g. glass or silica fiber or asbestos, allowing slight expansion of the parts, but adequate to retain and guide the solid reactant to the space 13 only. The glass envelope 17 surrounds the tube 11 to define a further annular space 19 between itself and such tube. Finally, the envelope 17 may be encased in an outer cover 20 on which the coils of an electric heater 21 are wound.

A chlorine inlet 22 leads to a chlorine preheater 23 which in turn leads into the inner space 24 defined by the tube 10. The output from the furnace extends from the space 19, through a chamber 25 surrounding the chlorine preheater 23, and finally to a conventional condenser 26, details of which have not been shown, since these may be conventional. Inlets 27 are provided in the upper structure 16 for loading material into the intermediate space 13 between the tubes 10 and 11.

The tubes 10 and 11 are formed of a porous material which can conveniently be the material known as Alundum. This material is temperature resistant and permits the ready flow of gases therethrough, while having sufficient structural strength to support solid material in the space 13, and not reacting with the other materials.

The reactor is first charged by pouring finely ground granular silicon (conveniently 40 to 50 mesh) into the inlets 27 substantially to fill the space 13 as a porous mass. Chlorine is introduced through the inlet 22 and reacts with the silicon on the inner surface of the silicon mass, reaction products finally passing to the chamber 25 and thence to the condenser 26. Once the reactor has settled down to operation, there will be in the inner space 24 a mixture of chlorine (which is being continuously added); silicon tetrachloride; and some of the higher chlorides (principally silicon hexachloride), which chlorides constitute the reaction products of the reaction of the chlorine on the inner surface of the silicon mass. This mixture of reagent gases, containing some free chlorine will permeate the porous tubes 10 and 11 and the porous mass of silicon, to react further with the silicon mass to produce an effluent gas.

In this form of reactor the direction of net gas flow is radially outwards towards the outer space 19, but since gas flow rates when distributed over such a large area are comparativly slow, gas diffusion and convection are active throughout the reactor, and the reaction products are well diffused throughout the reactor, to mix with and dilute the incoming chlorine, and by convection, the parts of the gas less reacted, i.e. richest in chlorine and therefore lightest, will tend to collect at the top of the reactor, while the gas that is most completely reacted will fall selectively towards the exit 25 from space 19. By this method it has been found that the loss of reactants as the less valuable tetrachloride is greatly reduced, and substantially improved yields of the higher chlorides can be achieved. For example, at 260° C. to 250° C., yields of 30% or 40% respectively of the higher chlorides can be obtained, of which one fifth or more are the chlorides with molecular weights even higher than the hexachloride. At still lower temperatures the percentage yield of higher valuable chlorides, in relation to the tetrachloride, continuously increases, although the decreased reaction rate sets an economic limit.

The effluent gas is then separated into its constituent parts in the condenser 26 in a conventional manner. The chlorine preheater 23 tends to avoid solids (e.g. still higher chlorides that may condense as solids and impurities such as iron chloride) collecting at and blocking the chlorine entry tube, and conventional arrangements will be made in the lower part of the reactor to collect and remove the solids containing the valuable higher members of the silicon chloride family.

Further dilution of the reacting gas chlorine in this case, may also be provided by adding a non-reactive gas or case, a waste product from the reactants, e.g. nitrogen or $SiCl_4$, as this is always available from the process and helps to prevent accidental contact of the pure gas with the solid before diffusion may have been completely effective in producing proper dilution.

By this process therefore the percentage of the product as higher chlorides is about 20 times that previously obtained, even with difficulty. It will also be appreciated that, other than a simple thermostat, this reactor requires almost no attention. It will also be seen that for the first time this invention makes the chlorides still higher than the hexachloride available in quantity, whereas heretofore they were accessible in research amounts only, and only with difficulty.

The production of the higher silicon chlorides has been used to describe the reactor and the principle by which it operates, since this illustrates the production of a basic raw material not previously economically available. However the reactor has use not only in this process, i.e. the production of an unstable product which is destroyed more rapidly as the temperature becomes higher. It is also applicable to equilibrium processes, e.g. the reaction of steam with carbon to produce $CO_2$ and hydrogen, rather than CO. This reaction occurs at low temperatures, rather than high, is endothermic, and as a result heat must be added. In prior art reactors this reaction tends to become localised and this local area in the reactor is quenched and ceases to function. In such other reactors therefore an endothermic reaction tends to require the overall use of a higher and undesirable temperature in order to combat this quenching effect, which higher temperature tends to produce CO rather than the desired $CO_2$. With the present reactor the endothermic heat loss and the added heat will both be fully distributed and with the uniform resulting temperature all parts of the reactor remain active at uniform controlled conditions.

The reactor is also useful in cases in which the amount of heat produced is inconveniently large, e.g. many chlorination reactions, for instance the reaction of chlorine with aluminium, antimony, iron, arsenic, beryllium and many other substances in which the use of chlorine in the direct production of the anhydrous chloride is complicated by the need for excellent refractories. This difficulty is greatly reduced with the present reactor, since the very large heat produced is automatically distributed throughout its volume, and ignition of the solid charge prevented.

It will also be appreciated that the gas inlet and outlet means may comprise more than one of each, situated at any location, bottom, top, or side, as related to the hollow space within the reactor, without affecting the principle of this process by which heat is distributed and temperature control maintained within the reactor.

It will be appreciated that in the foregoing example the process is made to take place in a thin layer of granular solid retained at the periphery of a hollow space large enough to allow free diffusion, convection and radiation throughout the volume of the space. By this method this space is filled essentially with the reaction product, in which a part only is the initial reactive gas, continuously enhanced by its regular addition.

It will be appreciated that this process therefore maintains an automatically stabilizing gas condition within this hollow space. If reaction rates are relatively high, the reactive gas will be consumed at the wall comparatively rapidly and its regular addition to this space will maintain only a rather low concentration in this gas mixture. By this method therefore even highly exothermic reactions are automatically self-limiting and the well known local overheating and even ignition usual with such reactions are substantially avoided. These considerations also apply in the converse to conditions in which process rates are comparatively slow, when the regular addition of the reactive gas builds up a higher proportion in the gas mixture in the hollow space, setting up self-regulating conditions. These considerations in the fully converse relation also apply to endothermic processes.

In order fully to utilize these self-regulatory processes it is arranged that the layer of granular solid reactant is thin enough that heat passes readily through its thickness so that a significant difference in temperature through this thin layer will not occur. Both heat and gas diffusion and convection pass readily throughout the process volume, and maintain essentially uniform conditions throughout.

I claim:

1. A process for the production of an effluent gas relatively rich in a silicon chloride higher than the tetrachloride, comprising:

(a) passing a mixture of reagent gases including chlorine in a confined space through granular solid silicon arranged in a thin layer of considerable area, said layer being of so little thickness that heat passes completely through its thickness in either direction without any appreciable obstruction whereby to prevent localized heating or cooling of the silicon,
   (b) introducing chlorine into said space and mixing said chlorine in said space, substantially before it contacts the silicon, with silicon-chloride reaction products already formed in the process by reaction of the chlorine with the surface of the layer of silicon bordering upon said space, whereby to generate said mixture,
   (c) and withdrawing effluent gas from the side of said layer remote from said space.

2. A process as claimed in claim 1, including the further step of separating silicon hexachloride from said effluent gas.

3. A process for the production of an effluent gas relatively rich in a silicon chloride higher than the tetrachloride, comprising
   (a) confining a thin distributed porous layer of granular silicon in an annular intermediate zone between a pair of coaxial porous tubes, the inner of said tubes defining within itself an inner space, and an outer space being located radially outwardly of the outer of said tubes,
   (b) forming in one of said spaces a mixture of reagent gases by introducing chlorine into said one space and mixing said chlorine, substantially before it contacts the silicon, with silicon-chlorine reaction products already formed in the process by reaction of the chlorine with the surface of the silicon bordering upon said inner space,
   (c) flowing said mixture of reagent gases through said distributed mass of granular silicon,
   (d) and withdrawing the effluent gas from the other of said spaces.

4. A process as claimed in claim 3, including the further step of separating silicon hexachloride from said effluent gas.

5. A process as claimed in claim 3, wherein said tubes are elongated and extend vertically, so that said one space is an elongated vertical space, and wherein said chlorine is introduced at a lower, centrally located part of said one space to facilitate rapid mixing thereof with the heavier silicon-chlorine reaction products.

References Cited
UNITED STATES PATENTS

| | | | |
|---|---|---|---|
| 2,315,208 | 3/1943 | Kinnaird | 23—288 |
| 2,602,728 | 7/1952 | Walton | 23—205 |
| 2,621,111 | 12/1952 | Stedman | 23—205 |
| 3,167,399 | 1/1965 | Hansen | 23—284 X |

EDWARD J. MEROS, *Primary Examiner.*

OSCAR R. VERTIZ, *Examiner.*

G. T. OZAKI, *Assistant Examiner.*